Jan. 31, 1956   E. TUNNICLIFF ET AL   2,732,592
EXTRUSION OF THERMOPLASTIC MATERIAL
Filed June 26, 1951
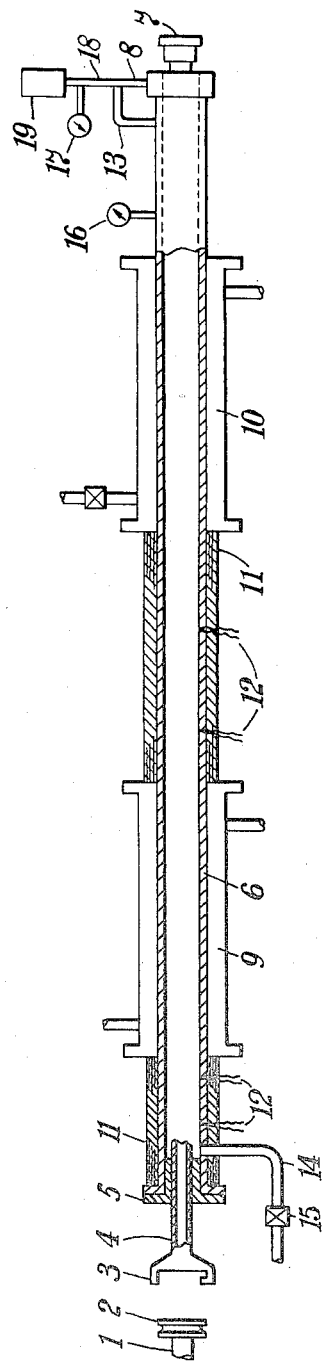
Inventor
Eustace Tunnicliff
Ronald Barlow
By
Webb Mackey & Burden
Attorney

United States Patent Office 2,732,592
Patented Jan. 31, 1956

2,732,592

EXTRUSION OF THERMOPLASTIC MATERIAL

Eustace Tunnicliff, Leigh, and Ronald Barlow, Accrington, England, assignors to British Insulated Callender's Cables Limited, London, England, a British company Application June 26, 1951, Serial No. 233,564

Claims priority, application Great Britain July 6, 1950

7 Claims. (Cl. 18—55)

This invention relates to a method of covering wire with thermo-plastic material in which after the extrusion of the material round the wire, the covered wire is cooled gradually by being passed through a bath (or baths) of fluid, for instance, water which decreases in temperature from a high value near the point of first entry to the minimum required at the far end.

In applying thermoplastic material by extrusion it is frequently necessary, in order to obtain the desired thickness, to make the application in several layers. An object of the improved method in accordance with the invention is to prevent distortion of the covering due to setting and contracting effects in the material which tend to produce voids by the local separation of the covering from the wire at the surface thereof and between the layers of the covering when more than one layer is used. The present invention deals with a covering material consisting of polymers of ethylene or of compound made up with a polymer or polymers of ethylene as a basis. Such materials will hereinafter be referred to as "polyethylene."

We have found that to ensure consistently successful results with polyethylene it is necessary to establish and maintain within fairly close limits the temperature distribution in the cooling bath. The following considerations apply to this. On cooling polyethylene down from the extrusion temperature (dependent on the grade of the material, e. g. about 165° C.) it behaves at first like a viscous liquid until about 115° C. solidification commences. In the range of temperature from 115° C. to 105° C. the material is in a plastic condition and is readily deformed by comparatively low stresses. Below this range the material is solid and cannot be deformed except by comparatively large forces. During cooling a large change in density takes place being about 0.77 gram/cc. at 165° C. and 0.92 at 20° C. In particular, a large change takes place in the range 115° C. to 105° C. that is to say, in the region where the polyethylene is solidifying.

If the covering is cooled rapidly down to solidification temperature at the outside surface, this surface sets while the inner part is still a viscous fluid or in a plastic state, and as the inner part proceeds to contract with further cooling it is drawn away from the surface of the wire.

In accordance with the invention it is provided that the covering solidifies substantially simultaneously throughout. In order to attain this result the path which the covered wire (or cable) follows during cooling is divided into three temperature zones which are maintained at least as regards the first two within fairly close limits; the cooling fluid being in the first zone kept at about 105° C. and in the second zone at about 90° C. The covered wire passes through these zones at such a rate that in the first of them substantially the whole of the covering arrives at a temperature between 105° C. and 110° C. In the second zone the covered wire remains sufficiently long for solidification to be complete.

In the third it is cooled down to the desired approach to the external temperature, for instance, 20° C.

It is preferred to use for the cooling process an enclosed tubular bath in which the cooling fluid is water maintained under an appropriate pressure to permit of a temperature of 105° C. without ebullition. The bath is arranged so that the three temperature zones above indicated are maintained without physical division being secured by appropriate arrangements of lagging and heating means such as steam jackets or electric heaters.

An example of an apparatus for cooling a polythene covering on a cable in accordance with the invention will now be described with reference to the accompanying diagrammatic drawing which is an elevation partly in cross-section of the apparatus.

Referring to the drawing, the outlet nozzle 1 of the extruder is formed with a grooved part 2, the outer flange of which is slotted to receive a bayonet fitting 3 on the end of a short length of tube 4. The bayonet joint makes a fluid tight connection between the tube 4 and the nozzle 1. The tube 4 fits through a fluid tight stopper 5 into the end of a metal cooling tube 6. At the opposite end of the cooling tube 6 there is provided an outlet gland 7 of a kind which is sealed by water under pressure, supplied through a pipe 8.

On the tube 6 are fitted two steam jackets, the inlet steam jacket 9 and the outlet steam jacket 10. Between these two jackets and between the inlet steam jacket and its inlet end, the tube 6 is provided wih lagging 11. In the lagged parts of the tube thermocouples 12 for measuring the temperature of water in the tube 6 pass through holes in the wall of the tube.

The cable passes centrally through the tube in a straight path from left to right, from the extruder nozzle to the outlet gland. Water passes slowly through the tube from right to left entering through the inlet pipe 13 and leaving through the outlet pipe 14. The rate of flow of water through the tube 6 is controlled by a valve 15 on the outlet pipe 14. Pressure gauges 16 and 17 are provided on the pipe 6 and the water supply pipe 18 respectively. The water is delivered to the pipe 18 by a pump 19.

The water entering the tube 6 through the inlet pipe 13 is at about 20° C. As it leaves the unlagged part of the tube 6 its temperature is raised rapidly by the outlet steam jacket 10 to 90° C. The water remains at about this temperature in the lagged part of the tube 6 between the steam jackets. As the water continues to flow through the pipe from right to left its temperature is rapidly raised from 90° C. to 105° C. by the inlet steam jacket. The water remains at about this temperature until it flows out of the tube 6 through the outlet pipe 14.

The steam jackets 9 and 10 may be replaced by any other form of heating device, for example, electric heaters.

The polyethylene covering is at about 165° C. when it leaves the extrusion nozzle 1. The cable passes directly into water at 105° C. in the first zone of the tube 6, which extends into the inlet steam jacket. This zone is of sufficient length to ensure that substantially the whole of the covering is reduced to a temperature between 105° C. and 110° C. From this zone the cable passes through the part of the tube 6 in which the temperature of the water is rising rapidly from 90° C. to 105° C. into the second zone which is situated between two steam jackets and extends into the outlet steam jacket. In this zone the temperature of the water is 90° C. The length of the second zone is sufficient to ensure that the whole of the covering solidifies. From this zone the cable passes into the part of the tube 6 in which the temperature of the water is being rapidly raised from 20° C. to 90° C. into the third zone in which the temperature of the water is 20° C. The third zone is of sufficient length to ensure that substantially the whole of the covering is reduced to a temperature not greater than 35° C., at which temperature the cable can safely be wound into a drum.

To attain the desired cooling, co-ordination of speed of movement of the cable with the length of the tube 6 must be carried out. For given dimensions of the bath the speed may be varied to deal with different thicknesses of covering. As an example, the following dimensions are given:

First cooling zone (105° C.), 9-ft. long
Second cooling zone (95° C.), 6-ft. long
Final cooling zone (20° C.), 4½-ft. long This is suitable for speeds of from 8 to 12 yards per minute or higher dependent on the thickness of covering. For example, two cables having the following dimensions were manufactured satisfactorily using a bath of the dimensions specified above. The first cable was passed through the bath at a speed nearer the upper limit and the second at a speed nearer the lower limit.

Cable 1:
Single conductor of a diameter—0.022" (.056 cm.)
Overall diameter of polyethylene covering—0.128" (.325 cm.)

Cable 2:
Two conductors side by side each of a diameter—0.036" (.091 cm.)
Maximum dimensions of polyethylene covering—
(a) In the plane common to the two conductors—0.160" (.406 cm.)
(b) At right angles to this plane—0.100" (.254 cm.)

Instead of a closed cooling bath an open trough may be used with a cooling liquid capable of being heated to 105° C. without boiling.

What we claim as our invention is:

1. A method of manufacturing an insulated electric conductor which comprises applying a covering of polyethylene to said conductor by extrusion, and passing said conductor during the cooling of said covering after extrusion through three zones, the temperatures of the zones and the rate of passage of the wire through them being so related that in the first zone, which is kept at a temperature of about 105° C., substantially all of the covering is reduced to between 105° C. and 110° C., in the second zone, which is kept at about 90° C., the covering solidifies completely and in the third zone the covering is cooled to the desired approach to the external temperature.

2. A method of manufacturing an insulated electric conductor which comprises applying a covering of polyethylene to said conductor by extrusion and passing said conductor from the extrusion die into a cooling fluid having three temperature zones (the first zone commencing adjacent the extrusion die), the temperatures of the zones and the rate of passage of the wire through them being so related that in the first zone, which is kept at a temperature of about 105° C., substantially all of the covering is reduced to between 105° C. and 110° C., in the second zone, which is kept at about 90° C., the covering solidifies completely and in the third zone the covering is cooled to the desired approach to the external temperature.

3. A method of manufacturing an insulated electric conductor which comprises applying a covering of polyethylene to said conductor by extrusion and passing said conductor from the extrusion die into water flowing in a direction opposite to the direction of movement of the wire and having three temperature zones (the first zone commencing adjacent the extrusion die), the temperatures of the zones and the rate of passage of the wire through them being so related that in the first zone, which is kept at a temperature of about 105° C., substantially all of the covering is reduced to between 105° C. and 110° C. in the second zone, which is kept at about 90° C., the covering solidifies completely and in the third zone the covering is cooled to the desired approach to the external temperature.

4. A method of manufacturing an insulated electric conductor which comprises applying a covering of polyethylene to said conductor by extrusion and passing said conductor from the extrusion die into water flowing in a direction opposite to the direction of movement of the wire and having three temperature zones (the first zone commencing adjacent the extrusion die), the temperatures of the zones and the rate of passage of the wire through them being so related that in the first zone, which is kept at a pressure high enough to raise its boiling point above 105° C. and at a temperature of about 105° C., substantially all of the covering is reduced to between 105° C. and 110° C. in the second zone, which is kept at about 90° C., the covering solidifies completely and in the third zone the covering is cooled to the desired approach to the external temperature.

5. A method of manufacturing an insulated electric conductor which comprises applying a covering of polyethylene to said conductor by extrusion, passing said conductor during the cooling of said covering after extrusion successively through three adjacent cooling zones and so controlling the lengths of the zones and the rate of passage of the wire through them that in the first zone, which is kept at a temperature of about 105° C., substantially all of the covering is reduced to between 105° C. and 110° C., in the second zone, which is kept at about 90° C., the covering solidifies completely and in the third zone the covering is cooled to the desired approach to the external temperature.

6. A method of manufacturing an insulated electric conductor which comprises applying a covering of polyethylene to said conductor by extrusion, passing said conductor from the extrusion die into a cooling fluid, applying heat to said fluid to create in it three temperature zones spaced along the path traversed by the conductor (the first zone commencing adjacent the extrusion die) and so controlling the lengths of the zones and the rate of passage of the wire through them that in the first zone, which is kept at a temperature of about 105° C., substantially all of the covering is reduced to between 105° C. and 110° C., in the second zone, which is kept at about 90° C., the covering solidifies completely and in the third zone the covering is cooled to the desired approach to the external temperature.

7. A method of manufacturing an insulated electric conductor which comprises applying a covering of polyethylene to said conductor by extrusion, passing said conductor from the extrusion die into a stream of cooling fluid moving in a direction opposite to the direction of movement of the wire, applying heat to said stream to create in it three temperature zones spaced along the path traversed by the conductor (the first zone commencing adjacent the extrusion die) and so controlling the lengths of the zones and the rate of passage of the wire through them that in the first zone, which is kept at a temperature of about 105° C., substantially all of the covering is reduced to between 105° C. and 110° C.

References Cited in the file of this patent

UNITED STATES PATENTS

| | | |
|---|---|---|
| 2,258,025 | Morris et al. | Oct. 7, 1941 |
| 2,369,858 | Ryan | Feb. 20, 1945 |
| 2,436,201 | Cole | Feb. 17, 1948 |
| 2,550,555 | Hallam et al. | Apr. 24, 1951 |
| 2,626,302 | Cox | Jan. 20, 1953 |